June 10, 1969 C. A. CALDWELL 3,448,689
IRRIGATION PUMP CONTROL APPARATUS
Filed May 29, 1967
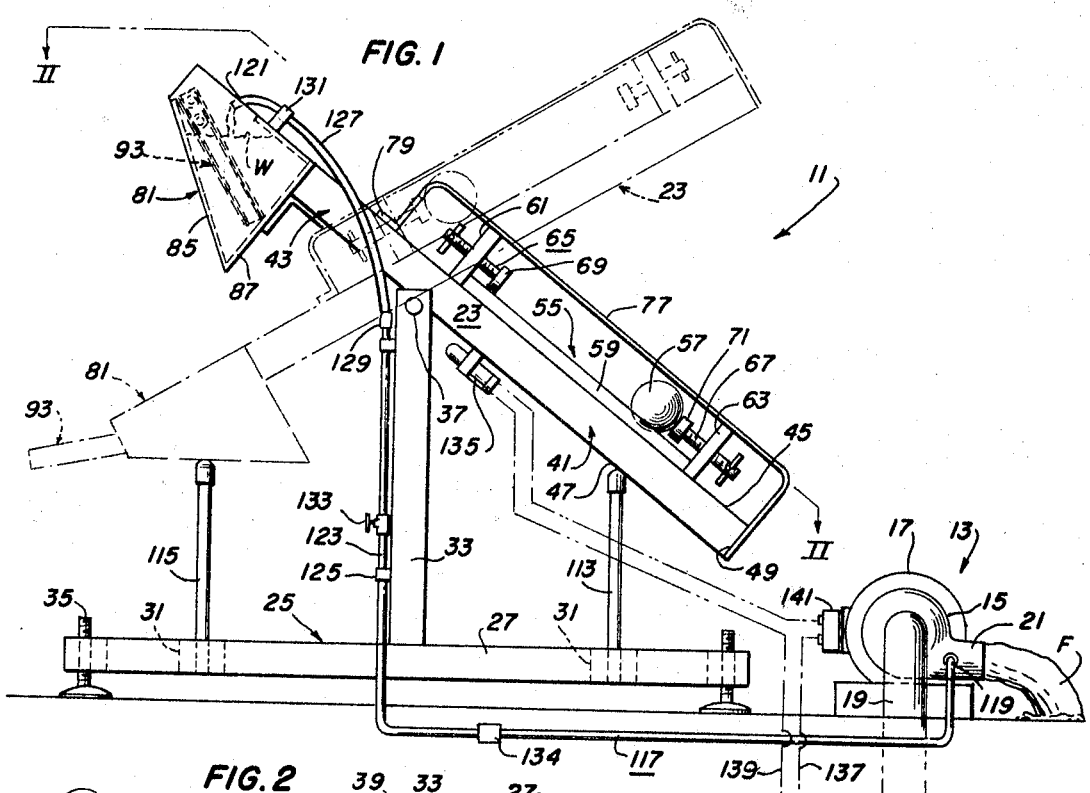
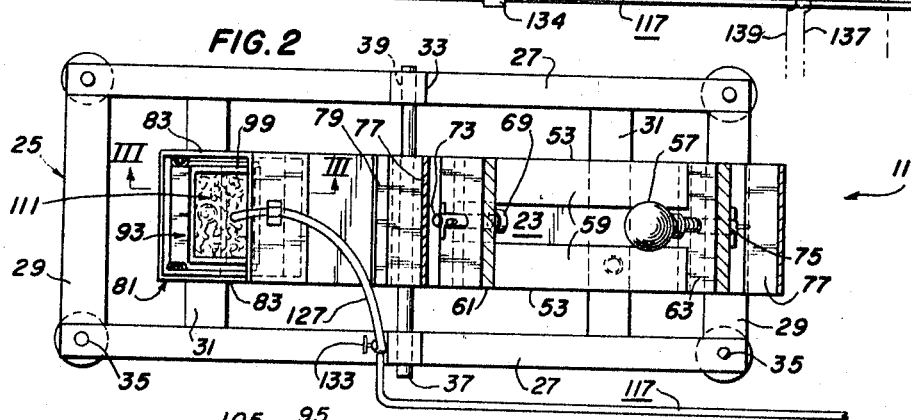
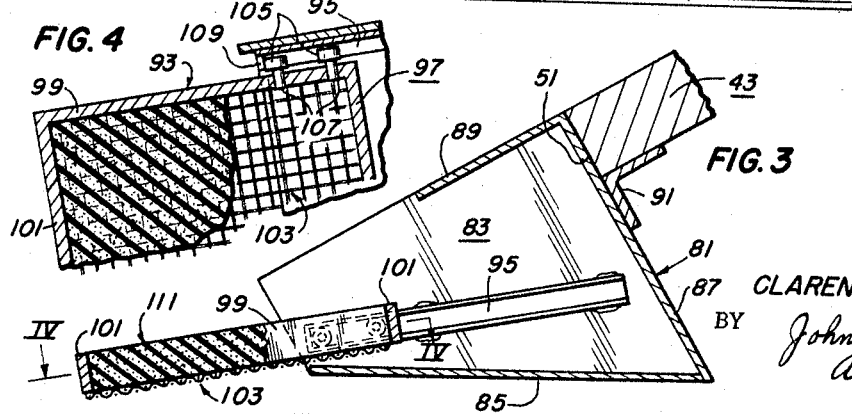
INVENTOR.
CLARENCE A. CALDWELL
BY John R. Walker, III
Attorney

United States Patent Office 3,448,689
Patented June 10, 1969

3,448,689
IRRIGATION PUMP CONTROL APPARATUS
Clarence A. Caldwell, 2190 Theda Ave.,
Memphis, Tenn. 38127
Filed May 29, 1967, Ser. No. 642,124
Int. Cl. F04d 15/00
U.S. Cl. 103—25                    5 Claims

ABSTRACT OF THE DISCLOSURE

Irrigation pump control apparatus responsive to weather changes and night and day weather conditions. The apparatus includes a long beam pivotally supported see-saw like, a shiftable weight on one end of the beam, a tank on the other end of the beam, a line for bleeding a small amount of water from the pressure or the discharge side of the pump and feeding it into the tank, and a track-mounted sponge shiftable into and out of the interior of the tank.

---

In the operation of the control apparatus, the water from the discharge side of the pump passes through the bleeder line, fills the tank and wets the sponge. The weight of the water in the tank pivotally moves the tank downwardly and such action, through the electric switch means, shuts off the pump; such pivotal movement of the tank also causes the sponge to move out of the interior of the tank and into the ambient air currents and sunlight. After sufficient water has evaporated from the sponge, the weight on the other end of the beam overbalances the tank and sponge and pivotally raises the tank; as the tank pivotally raises, the electric switch is again closed and the pump restarted.

BACKGROUND OF THE INVENTION

Field of the invention

The invention pertains to automatically or semi-automatically operable means for starting, stopping or regulating the supply of irrigation water in an agricultural irrigation system; the invention is particularly directed to such control means responsive to varying weather conditions or varying humidity and temperature conditions at the locale of the irrigation system.

Description of the prior art

Patent No. 2,843,693 issued July 15, 1958, discloses a rain-actuating means for operating a lawn sprinkler system. An open topped pan on one end of a see-saw like beam catches rain water, and the weight of the rain water overbalances a weight mass on the other end of the beam to stop the flow of water through the sprinkler system; the water in the pan evaporates permitting the beam to pivotally move and in so doing to close a switch and restart the water flowing through the sprinkler system. The apparatus in Patent No. 2,843,693 does not include a bleeder line leading from a water supply line for filling the tank and thus the apparatus apparently relies on falling rain water to shut the system off; a problem also in a control system such as disclosed in Patent No. 2,843,693 is the rather long interval required for water contained in the rain-catching pan to evaporate. Slow evaporation of the counterbalancing rain water contents of the pan causes the control apparatus to be less responsive or less sensitive to weather changes than is desirable in many agricultural irrigation systems.

SUMMARY OF THE INVENTION

An object is to provide an improved irrigation water supply control means wherein a small amount of the water from a supply pump or water pressure system is bled from the system and piped into a tank to overbalance a weight mass and stop the flow of water. A further object is to provide a control means utilizing a sponge or sponge-like mass which is shiftable into and out of the interior of the interior of the overbalancing tank means; such a sponge which is shiftable outside of the tank and into the ambient air currents and sunshine provides means whereby the control apparatus is readily responsive to weather changes or responsive to tempearture and humidity changes.

BRIEF DESCRIPTION OF THE DRAWING

FIG. 1 is a side elevational view of the control apparatus of the present invention shown in conjunction with an irrigation pump.

FIG. 2 is a top plan view taken as on the line II—II of FIG. 1.

FIG. 3 is a vertical plane sectional view taken as on the line III—III of FIG. 2 with a part of the sponge material broken away for purposes of clarity.

FIG. 4 is a fragmentary sectional view taken as on the line IV—IV of FIG. 3.

DESCRIPTION OF THE PREFERRED EMBODIMENT

The control apparatus is indicated by numeral 11 and will be described in conjunction with a somewhat typical irrigation pump installation 13. The pump installaton includes a centrifugal pump 15 driven by an electric motor 17, pumping water from a well pipe 19. The pump installation includes a water discharge passageway 21 for conducting a flow of water F into typical irrigation ditches (not shown). It will be understood that when the term "pump" is used, it will be deemed to include any water supply means without departing from the spirit and scope of the present invention. As for example, in place of a motor driven pump the water supply could come from a storage ditch which supplies water through smaller channels to the crop, and the water flow is controlled by a lift gate or valve.

Apparatus 11 includes a beam 23 pivotally supported intermediate its ends on an open framework base 25. The base is of generally symmetrical inverted T configuration and includes a pair of horizontal plate members 27 connected by end and intermediate cross members 29, 31 respectively and paired upright members 33 fixed at the lower end portions thereof to respective horizontal plate members 27. Each end portion respectively of horizontal plate members 27 is preferably fitted with a screw jack 35; the screw jacks provide means for leveling base 25.

A horizonal axle 37 extending respectively through apertures 39 in the upper end portions respectively of upright members 33 pivotally supports beam 23 see-saw fashion on base 25. For purposes of description, beam 23 will be considered as including a first beam arm 41 and second beam arm 43 projecting oppositely and arranged respectively on opposite sides of axle 37; as may be seen in FIG. 1, first beam arm 41 is substantially longer than second beam arm 43. Beam 23 is generally boardlike and includes respectively top and bottom surfaces 45, 47; opposite end surfaces 49, 51 and opposite side surfaces 53.

A runway 55 extends along the upper side of first beam arm 41 and provides track means for a spherical solid weight 57. A pair of horizontally spaced apart track strips 59 are secured respectively on top surface 45 of beam arm 41 and provide runway means for spherical weight 57. The weight is adapted for bi-directional shifting movement along runway 55 and respectively toward and away from the pivot axis of beam 23.

Inner and outer stop means are arranged respectively at the opposite ends of runway 55 and respectively engage and stop the travel of weight 57 in its movement respectively toward and away from horizontal axle 37. Inner and outer stop means are substantially alike and include respectively stop boards 61, 63 fixed transversely on top surface 45 of beam arm 41 and stud screws 65, 67 threadedly secured respectively in stop boards 61, 63. Stud screws 65, 67 respectively include head portions 69, 71 and handle portions 73, 75. Threadedly manipulating screws 65, 67 adjustably regulates the travel of weight 57 and the stopped positions of the weight. An inverted channel-shaped cover 77 preferably is secured over first beam arm 41; cover 77 is fixedly secured on the upper surfaces of stop boards 61, 63 and respectively at its opposite ends to beam surfaces 45, 49; a flanged portion 79 of cover 77 is fixedly secured on beam top surface 45.

A tank 81 is fixedly secured on the distal end portion of second beam arm 43. Tank 81 is fabricated of sheet metal material and includes a pair of generally triangular side walls 83 interposed by secured respectively by bottom, back and top walls 85, 87, 89. An angle iron member 91 preferably reinforces the securement of tank 81 on beam arm 43 and the outer surface of back wall 87 against the end surface 51 of beam arm 43. Preferably, top 89 extends over substantially half the upper horizontal extension of tank 81; bottom wall 85 and opposite side walls 83 define substantially a chute-like opening opening upwardly and outwardly relative to the extension of second arm 43.

A carriage 93 mounted on guide rails 95, 95 is adapted for shifting movement into and out of the interior of tank 81. Carriage 93 includes a frame 97 substantially of square configuration including oppositely arranged paired side members 99 and oppositely arranged paired end members 101. A heavy gauge wire screen 103 is fitted over the lower opening of frame 97 and fixedly secured to the undersurfaces respectively of side and end members 99, 101. Guide rails 95 each are channel sectioned and secured in confronting co-planar arrangement respectively on opposite side walls 83 of tank 81. Rollers 105 mounted from carriage 93 are runningly fitted respectively in the channels of guide rails 95. Pins 107 projecting respectively perpendicularly from side members 99 of frame 97 journal respective rollers 105. Four rollers 105 arranged in oppositely paired arrangement preferably support carriage 93 in rails 95 for bidirectional shifting movement of the carriage. A pair of stop lugs 109 (one shown) is provided; a lug 109 is fixed on the outward terminal portion of each rail 95 and limits the outward shifting movement of carriage 93. Guide rails 95 are preferably inclined relative to bottom wall 85 of tank 81 in order that carriage 93 may be readily gravitatingly ejected from tank 81 when the tank is in a down position (see broken line position in FIG. 1).

A mass of water-absorbent material or a sponge 111 is fitted in carriage 93 and is arranged coextensive with substantially the entire area within frame 97; sponge 111 is snugly fitted within frame 97 and is supported on screen 103.

A pair of stop members including a first stop member 113 and a second stop member 115 are provided for stopping the downward pivotal travel respectively of first and second beam arms 41, 43. Stop members 113, 115 are each rod-like and secured upstandingly respectively on intermediate cross members 31 of base 25. The upper terminal portion of first stop member 113 is adapted to abuttingly engage bottom surface 47 of beam 23 and to stop the pivotal beam movement with tank 81 in an up disposition (see full line showing in FIG. 1). The upper terminal portion of stop member 115 is adapted to abuttingly engage bottom wall 85 of tank 81 and stop the pivotal movement of beam 23 with tank 81 in a down disposition (see broken line showing in FIG. 1).

A bleeder line 117 connects the interior of water discharge passageway 21 of the irrigation pump means with the interior of tank 81. Inlet end 119 of bleeder line 117 communicates with the interior of water discharge passageway 21; outlet end 121 of line 117 empties into tank 81. Bleeder line 117 preferably includes a rigid conduit 123 bracketed at 125 to an upright base member 33 and a flexible conduit 127 connected at 129 to conduit 123 and bracketed at 131 to tank top wall 89. Bleeder line 117 includes a hand valve 133 for regulating the flow of water through the line. Also, a suitable water filter 134 is provided in line 117.

A mercury type switch 135 is bracketed to bottom surface 47 of beam 23 and is actuated to a closed or open disposition by the pivotal action of the beam. Switch 135 is electrically interposed in the circuit driving pump 15 by electricity conducted through leads 137, 139. Other electrical circuit configurations may, of course, be utilized in certain applications of the apparatus if desired. Switch 135 is actuated to a closed pump-running disposition when first beam arm 41 is stopped in pivotal downward travel by first stop member 113; switch 135 is arranged in an open pump-stopped disposition when second beam arm 43 is stopped in pivotal downward travel and tank 81 abuttingly engages second stop member 115.

FIG. 1 illustrates the apparatus with beam 23 canted to the right with tank 81 in an elevated disposition, with switch 135 closed and with the motor and pump energized and pumping a flow of water F. FIG. 1 also illustrates water passing through bleeder line 117 and issuing from outlet end 121, and further with tank 81 almost full, and with water level W relatively high in the tank. The high water level in tank 81 indicates the apparatus is just prior to being moved to the arrangement illustrated in broken lines in FIG. 1; the water level in the tank indicates the weight of the water is almost sufficient to overbalance the weight of weight ball 57 and move tank 81 to the down position illustrated in the figure.

As bleeder line 117 fills tank 81 and overbalances weight 57, the following actions occur somewhat simultaneously:

(1) Weight 57 rolls along runway 55 and abuttingly engages stop screw head 69 of the inner stop means of the apparatus.

(2) Mercury switch 135 is tilted to an off disposition thereby stopping motor 17 and pump 15; this in turn stops flow F of water and also the flow through bleeder line 117 into tank 81.

(3) The water contents of tank 81 rushes out the chute-like opening in tank 81 and the rushing water in combination with the force of gravity moves carriage 93 outwardly against carriage stop lugs 109.

(4) The weight of the water in water-saturated sponge 111 is sufficient to overcome the weight of ball weight 57 and to retain the apparatus in the configuration shown in broken lines in FIG. 1.

When air currents and sunshine have evaporated enough of the water in saturated sponge 111, beam 23 will rock to the disposition shown in full lines (FIG. 1), the pump and motor will be started and the cycling action of the apparatus will be continued.

Various adjustments may be made which regulate the cyclic actions of the apparatus: Turning inward on bleeder line hand valve 133 causes tank 81 to fill more slowly and thus extends the running time of each water pumping cycle. Also, by turning inward on stop screw 67 less water will be required in tank 81 to overbalance weight 57. Other adjustments will become apparent to those skilled in the art as they install and use the apparatus.

Now, while I have shown and described an exemplary embodiment of the present invention, it will be understood that various modifications and rearrangements of components and elements of structure may be made without departing from the scope of the invention.

I claim:

1. In an irrigation installation including an electrically driven pump and including structure defining a water discharge passageway, control means for stopping and starting said pump in response to varying weather conditions at the locale of said pump comprising a beam, means pivotally supporting said beam intermediate its length and on a horizontal axis, said beam being adapted for bi-directional pivotal travel, said beam including first and second oppositely projecting beam arms arranged respectively on opposite sides of said pivot axis, first and second stop means for stopping the downward pivotal travel respectively of said first and second beam arms, a runway extending along said beam, a weight supported on and adapted for bidirectional shifting movement along said runway and respectively toward and away from said pivot axis, inner stop means and outer stop means each mounted on said beam at the respective inner and outer end of said runway, said inner stop means being adapted to engage and stop said weight in its travel toward said pivot axis, said outer stop means being adapted to engage and stop said weight in its travel away from said pivot axis, tank fixed on the distal end of said second arm having an opening opening generally upwardly and outwardly relative to the longitudinal extension of said second arm, a carriage, guide means movably supporting said carriage for bidirectional shifting movement of said carriage generally toward and away from said pivot axis and respectively substantially into and out of the interior of said tank, sponge means including a mass of porous water-absorbent material supported on said carriage, bleeder line means having an inlet end communicating with the interior of said water discharge passageway and an outlet end communicating with the interior of said tank, switch means electrically interposed in the electrical circuit driving said pump and with said switch means being arrangeable in a closed circuit pump-running disposition or in an open circuit pump-stopped disposition, and means responsive to the bidirectional pivotal movement of said beam for actuating said switch means respectively to a closed or open circuit disposition, said switch means being in a closed pump-running disposition when said first beam arm is stopped in its pivotal downward travel by said first stop means, said switch means being in an open pump-stopped disposition when said second beam arm is stopped in its pivotal downward travel by said second stop means.

2. The pump control means of claim 1 wherein said inner and outer stop means each includes selectively adjustable means for varying the position at which said weight is stopped in its movement toward or away from said pivot axis.

3. In an irrigation installation including water supply means and including structure defining a water discharge passageway, control means for stopping and starting said water supply means in response to varying weather conditions at the locale of said water supply means comprising a beam pivotally supported intermediate its ends on a horizontal axis and defining a beam arm, a weight supported on and longitudinally shiftable along said beam, tank means secured on the distal end of said beam arm with said tank means having an opening adjacent the outer end thereof, bleeder line means having an inlet end connected with said water discharge passageway for bleeding a small amount of water from the discharge passageway and for feeding the water into said tank means; a carriage, guide means movably supporting said carriage for bidirectional shifting movement toward and away from the pivot axis of said beam arm means through said opening of said tank means, sponge means supported on said carriage adapted to be moved into and out of the interior of said tank means, and means responsive to the pivotal up and down movement of said beam arm means for causing starting of said water supply means and flow of water through said discharge passageway in response to upward movement of said beam arm means and for causing stopping of said water supply means and flow of water through said discharge passageway in response to downward movement of said beam arm means.

4. In an irrigation pump installation including water supply means and including structure defining a water discharge passageway, control means for stopping and starting said water supply means in response to varying weather conditions at the locale of said water supply means comprising a long beam pivotally supported intermediate its ends in a see-saw like manner, a weight supported on and lonigtudinally shiftable along an end portion of said beam, a water tank secured on the other end of said beam with said tank having an opening adjacent the outer end thereof opening substantially outwardly from the extension of said beam, bleeder line means having an inlet end connected with said water discharge passageway for leading a small amount of water from the pressure or discharge side of said water supply means and for feeding water into said tank, water absorbent means including a sponge shiftably mounted from said other end of said beam on a track for shifting movements substantially away from and toward said weight and shiftable into and out of the interior of said tank and through said opening in said tank, means responsive to the pivotal see-saw movement of said beam for causing actuation of said water supply means in water flow disposition or a water stopped disposition.

5. In an irrigation installation including water supply means having channel means defining water discharge passageway means and having valve means adapted for regulating the flow of water through said water discharge passageway, means for controlling said valve means in response to varying weather conditions at the locale of said water discharge passageway comprising beam means, pivot means pivotally supporting said beam means on a horizontal axis intermediate its length, said beam means defining a beam arm means projecting radially from said pivot axis and adapted for pivotal up and down movement, tank means secured on the distal end of said beam arm means having an opening opening generally upwardly and outwardly relative to the longitudinal extension of said beam arm means, bleeder line means having an inlet connected with the water discharge passageway of said water supply system and adapted for bleeding a small quantity of water from said discharge passageway and feeding the water into the tank means, a weight mass, means supported from said beam arm means guidingly constraining said weight mass in movement toward and away from the pivot axis of said beam arm means, a carriage, guide means movably supporting said carriage for bidirectional shifting movement toward and away from the pivot axis of said beam means and substantially into and out of the interior of said tank means, sponge means supported on said carriage adapted to be moved into and out of the interior of said tank means, and means responsive to the pivotal up and down movement of said beam arm means for causing said valve means to open in response to upward movement of said beam arm means and to close in response to downward movement of said beam arm means.

References Cited

UNITED STATES PATENTS

| 2,403,688 | 7/1946 | Smith | 103—25 |
| 2,577,337 | 12/1951 | Lancaster | 137—78 |
| 2,843,693 | 7/1958 | Scrivel | 200—85 |
| 3,174,496 | 3/1965 | Hoeppel | 137—78 |
| 3,309,474 | 3/1967 | Heinrich | 103—25 X |

WILLIAM L. FREEH, *Primary Examiner.*

U.S. Cl. X.R.

137—78; 200—61.04